(12) United States Patent
Goertzen

(10) Patent No.: US 7,689,831 B2
(45) Date of Patent: Mar. 30, 2010

(54) METHOD AND SYSTEM FOR SECURING INTERFACE ACCESS VIA VISUAL ARRAY PATHS IN COMBINATION WITH HIDDEN OPERATORS

(75) Inventor: Norm Frank Goertzen, Winnipeg (CA)

(73) Assignee: Passrules Canadian Security Inc., Winnipeg, Manitoba (CA)

( * ) Notice: Subject to any disclaimer, the term of this patent is extended or adjusted under 35 U.S.C. 154(b) by 1122 days.

(21) Appl. No.: 11/214,137

(22) Filed: Aug. 29, 2005

(65) Prior Publication Data

US 2006/0047969 A1   Mar. 2, 2006

Related U.S. Application Data

(60) Provisional application No. 60/605,646, filed on Aug. 30, 2004.

(51) Int. Cl.
   *H04K 1/00* (2006.01)
(52) U.S. Cl. ............................ 713/185; 713/182; 726/9; 726/26; 726/27
(58) Field of Classification Search .................. 713/185
   See application file for complete search history.

(56) References Cited

U.S. PATENT DOCUMENTS 5,425,102 A * 6/1995 Moy ........................... 713/183

| | | |
|---|---|---|
| 6,209,104 B1 | 3/2001 | Jalili |
| 7,143,440 B2 | 11/2006 | Ginzberg |
| 2004/0123151 A1 | 6/2004 | Mizrah |
| 2005/0044425 A1 | 2/2005 | Hypponen |

FOREIGN PATENT DOCUMENTS

| | | |
|---|---|---|
| EP | 0667801 | 8/1995 |
| WO | WO 96/18139 | 6/1996 |
| WO | WO 01/77792 | 10/2001 |
| WO | WO 01/77792 A2 * | 10/2001 |

\* cited by examiner

*Primary Examiner*—Nasser Moazzami
*Assistant Examiner*—Fikremariam Yalew
(74) *Attorney, Agent, or Firm*—Adrian D. Battison; Ade & Company Inc.

(57) ABSTRACT

A method and system for securing interface access via visual array patterns in combination with hidden operations improves the security of computer systems and dedicated terminals. A hint display is generated in at least a quasi-random fashion that may be an array of numerical digit values. A user input is received that represents selection of a pattern of elements chosen from the hint display and combined in an algorithm using one or more mathematical, relational and/or logical operations. A pre-defined pattern and algorithm are used to generate a token from the hint display that is compared with the user input to verify that the user knows the pattern and algorithm. Further ease of use can be provided by dividing a hint display array into sub-arrays while providing a clue such as color to indicate each sub-array to the user.

9 Claims, 3 Drawing Sheets

METHOD AND SYSTEM FOR SECURING INTERFACE ACCESS VIA VISUAL ARRAY PATHS IN COMBINATION WITH HIDDEN OPERATORS

CROSS-REFERENCE TO RELATED APPLICATION

This application is related to U.S. provisional application Ser. No. 60/605,646 filed on Aug. 30, 2004 from which it claims benefit under 35 U.S.C. 119(e),the disclosure of which is incorporated by reference.

BACKGROUND OF THE INVENTION

1. Technical Field

The present invention relates generally to graphical/textual user interfaces, and more specifically, to a method and system for securing machine interface access.

2. Description of the Related Art

Computer systems and dedicated devices such as automated teller machines (ATMs) increasingly provide access to interfaces that must be protected from unauthorized use. Typical security on such user interfaces is provided by a password or "personal identification number" PIN) that must be provided to the user interface via an input device prior to further access by an individual (or in some instances another machine) accessing the interface.

The level of security provided by a "weak" password or token such as a password or PIN is generally related to its length and arbitrariness. However, the same factor is also determinative of the difficulty for a human to remember the token. Also, the number of possible token element values, e.g., just digits versus digits plus letters is generally made larger to improve security, but the input set size increase is generally either thwarted by use of common words or numbers within the total possible space of values.

While it is possible to provide "hints" to a user that will stimulate a recollection of the token, such hints also provide a potential security breach in that the token may be discoverable via guessing once the hint is given. Other systems include a secondary password that has some concrete meaning to the token owner that can be used to reveal the actual token. For example, an interface may use the users mother's maiden name or "favorite animal", etc. as a secondary token to protect the underlying access token if the user forgets.

Two-dimensional textual or graphical hint systems have been proposed, from systems that actually display the password in a form such as a "hidden word" puzzle to systems that use a randomized arrangement of icons that must be selected in order or a particular arrangement of icons that must be selected in a pattern in order to satisfy token entry. All of the above systems have an advantage in that they are not easily overcome by mere repetitive machine input.

However, all of the above systems may reveal their underlying token eventually through human observation, especially when the underlying token hiding mechanism is known a priori. For example, if it is known that the token hiding mechanism is a particular arrangement of icons that must be selected in a pattern, an observer can ignore the actual icons and merely note the pattern.

A token system having improved "strength" can rely on a smaller set of element input values, can use longer-lived passwords and/or can be used across multiple systems without the same risk of compromise as weaker passwords.

Therefore, it would be desirable to provide a method and system for hiding tokens in a hint display that cannot be easily discovered through observation of token entry patterns and values.

SUMMARY OF THE INVENTION

The above objective of hiding tokens in a hint display that cannot be easily discovered through observation of token entry. is achieved in a method and system.

The method and system displays a hint display that includes a plurality of elements each having a value and a position, which may be an array of numerical digits. The method and system receive a sequence of user input corresponding to selected patterned sequence of the displayed elements combined in an algorithm using one or more operators to perform one or more operations on the patterned sequence.

The method and system verifies whether or not the user knows the proper pattern and algorithm by computing a token from the hint display and comparing the user input to the token. Access to one or more resources of the system or for which access is controlled by the system is conditioned upon a match of the token to the user input.

The operators employed to compute the token from the pattern may be mathematical (including logical) operators or relational operators. One or more of the pattern elements may be excluded from the token computation, which may be conditioned upon a relational operation or by ignoring one of the pattern elements on a fixed basis.

The method may be embodied in a general-purpose computer system, a browser executing within a general-purpose computer system or a dedicated terminal. The method may also be embodied in a computer program product that encodes program instructions for carrying out the steps of the method.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

Figure 1:
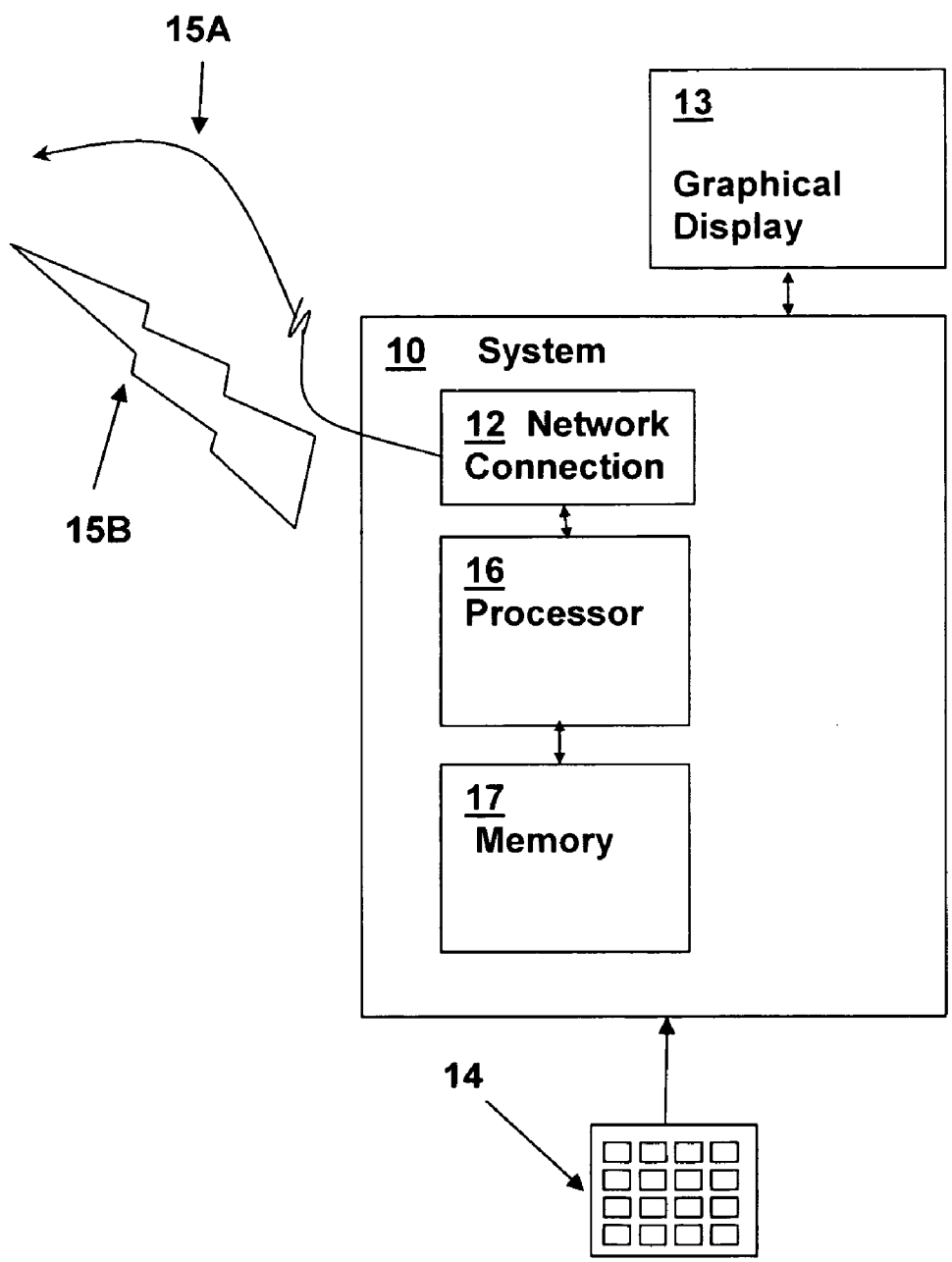
FIG. 1 is a block diagram of a system in which an embodiment of the present invention may be practiced.

The present invention provides improved security for systems accessed through entry of a token or password via a method that is implemented by execution of program instructions. The techniques are applicable to replace traditional password or PIN entry within computer systems or dedicated terminals such ATMs. In computer systems, the present invention may be employed in the operating system of a general-purpose computing system, embedded in a dedicated application, or provided via a web page interface downloaded from a server, for example via an extensible markup language (XML) program or java script or program. The present invention in general protects access to a resource, such as a login access to a system, financial information and transactional capability at an ATM, or other secured resource such as an application or database.

Rather than merely accepting entry of a password or token and optionally processing the token to compare it to a stored value, as traditional password systems do, the present invention effectively generates a randomized token on-the-fly. The randomized token is generated via rule-based processing from a set of values selected from a hint display that is presented to the user. There are two components to the processing: 1) a pattern by which the user selects a sequence of elements from the hint display; and 2) an algorithm that uses one or more operators in one or more operations performed on values produced from at least a portion of the sequence of elements in order to generate the token. The hint display can be a randomly generated set of elements bearing no pre-defined relation to the pattern or algorithm other than the values and value ranges of the elements must suitable for use with the particular algorithm employed and the pattern must fit the display. If the hint display is randomly generated as a single array or other display, then the display can be generated prior to knowing the user via a user identification code or other means. The sequence is then chosen from the appropriate positions in the hint display once the user is known. Alternatively, if the user is known prior to generating the display, the sequence can be randomly generated first and hidden at particular positions in the hint display that correspond to the positions within the above-mentioned pattern by seeding the non-patterned locations with another randomly generated set of elements.

After the sequence of elements is known, the algorithm is applied to values of the sequence of elements to generate the token, which is generally also a sequence of numbers, but may be a single number, such as a summation of all the digits in the pattern. Operators can combine any number of values from the sequence and reduce them in the output sequence or expand them in the output sequence. For example, a sum of three values from the pattern elements may represent a reduction of 3:1 in the output sequence, but a sum, product and "larger of" operator applied to two values in sequence would represent an expansion of 2:3 in the output sequence. The operators used can be mathematical (including logical) or relational, such as "the larger of" or "the smaller of" operators applied to two numbers. In general, it is not desirable to reduce the number of elements in the output sequence that provides the access token below a certain level, as a short token is easier to "guess".

The user mimics the operation of the patterned sequence selection and the operator-based algorithm from memory and enters a token value based on the selection and mental computation. The level of complexity of the mental computation required can be adjusted by selecting appropriate operators and the design of the total algorithm, which is user-settable. For example, a simple algorithm could model a horizontal line through an array of digits where the token sequence value is the lesser of each pair of digits from left to right in the line. A very complex algorithm could combine apparently random positions selected sequentially from an array of values and combine them using a different mathematical operation for each value.

Additionally, the level of security of a system can be varied in without changing the pattern and algorithm for a user. The pattern can be truncated to reduce the length of a required token, changing the range of values allowed for each element, and/or fixing the clue table as a static array. Each of the above techniques do not affect the underlying pattern and algorithm assigned to a user's security mechanism, but adapt the level of security and complexity to a particular instance of an access to a system or access to a particular system.

The present invention also provides a mechanism for sharing access information on a one-time basis without compromising the underlying pattern and algorithm. If the owner of the access pattern and algorithm knows a particular hint display, then another person can be told the resulting input token without compromising the pattern/algorithm combination.

Referring now to the figures, and in particular to FIG. 1, a networked system within which embodiments of the present invention may be practiced is depicted in a block diagram. The depicted system 10 is representative of a general class of computing devices that include a processor 16 and a memory 17 coupled to processor 16 for storing data and program instructions for execution by processor 17. A graphical display 13 is coupled to system 10 and may in fact be integrated within the same housing, as will generally be the case with ATMs and portable devices such as notebook/tablet computers and personal digital assistants (PDAs). A keyboard or keypad 14 is also coupled to (or integrated within) system 10 to receive user input in accordance with an embodiment of the present invention. A pointing device may be used as an alternative, but as will be noted below, using a pointing device for input requires that elements for all input values be present on the screen of graphical display 13, whereas with a keyboard or keypad, the values need not be present on the screen.

A network connection 12 implements either a wired 15A or wireless 15B interface to processor 16 and although a network connection is not a requirement of the present invention, devices such as ATMs generally require some form of networking for financial access operations.

Figure 2:
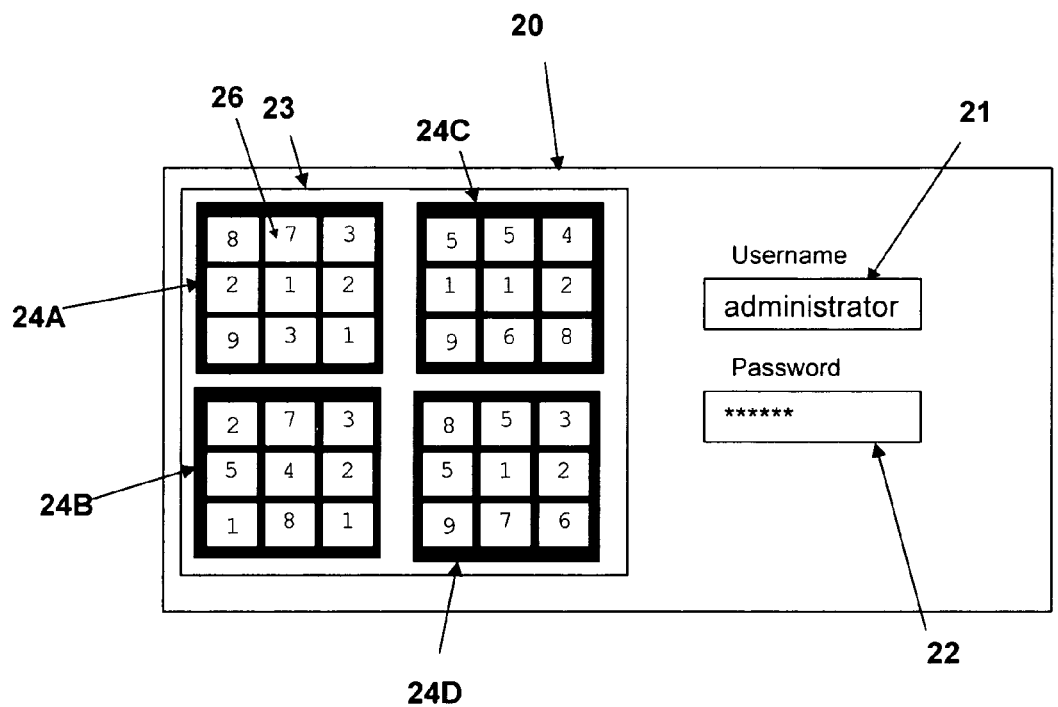
FIG. 2 is pictorial diagram depicting a user interface in accordance with an embodiment of the present invention.

Referring now to FIG. 2, a user interface in accordance with an embodiment of the present invention is depicted as a screen 20 of graphical display 13. A hint display 23 made up of four 3×3 sub-arrays 24A-D is shown. Each sub-array contains a plurality of elements 26, each of which has a unique position within hint display 23. Each of elements 26 also has an associated value that may or may not be unique. In the illustrative example, the value is the numerical value of the digit displayed on the face of each element 26. However, the present invention is not limited to numerical digits and the values do not have to match the displayed information on the corresponding elements. For example, graphical icons may be used instead of numbers, selection made via a pointing device and the hidden algorithm that is combined with the selection sequence may be a logical operation that combines the information provided one or more of the icons in a logical fashion.

Also, while a single array may be used to implement the present invention, use of sub-arrays provides another level of hint to the user in that the four sub-arrays shown can be presented in any arrangement on the screen 24A-D. The user determines the proper sub-array 24A-D for each element the user enters by a clue unique to each sub-array 24A-D such as a unique color of a frame around each sub-array or the color of the values (e.g., digits) displayed on the individual elements 26. Screen 20 also includes fields 20,21 for entry of a username and password, as are generally found on login screens and the like. However, entry fields are not a requirement of the present invention and screen 20 may consist solely of hint display 23, particularly when all values to be entered have corresponding elements present on screen 20, in which case a pointing device such as a mouse or touch screen may be used to implement the input device that receives the token sequence. User identification field 20 is not needed if the user is known a priori, if the pattern/algorithm is common to all users, or if a more relaxed security scheme is tolerable in which multiple tokens are permitted and used via matching to identify the user.

Elements 26 of sub-arrays 24A-D can be randomly or quasi-randomly generated to initialize the array. If so, a pattern of elements 26 is used to select a sequence of values from the elements 26 that will correspond to the correct sequence of elements known by the user. Alternatively, a sequence of elements can be generated, "seeded" in the pattern locations, and then other randomly generated "don't care" values can be filled in the other element 26 locations in sub-arrays 24A-D. If hint display 23 is divided into sub-arrays, then the sequence must also take into account the proper placement in the correct sub-array for each element. For example, if sub-arrays 24A-D are colored respectively: {red, blue, yellow, green}, and the proper element sequence known by the user is top row red, middle row blue, then the sequence according to the illustrated hint display 23 is 8,7,3,5,4,2 assuming left-to-right reading of the row.

The next portion of the security mechanism implemented by the present invention is the combination of the sequence values using a hidden algorithm (as opposed to the visible pattern illustrated above). The selected sequence is then operated on by at least one operator in at least one operation. The operators may be mathematical operators such as addition, subtraction, multiplication and division, an identity (or "copy" or "repeat") operator that yields the value of the element, or relational operators such as "the smaller of" or "the greater of" and may operate on two or more elements or in some cases only one. Not all of the operations are identity operations, or the algorithm would not be hidden and would merely reveal the sequence above, although a system in accordance with an embodiment of the present invention can additionally implement a "non-hidden" algorithm as an option having a lowered security level. A non-hidden algorithm is provided by a sequence of identity operators, one for each element in the pattern, such that the output of the algorithm is identical to the input sequence. Hidden constants may also be employed in combination with the above operators, for example "add 1 to each digit" or "enter digit if>4" and similar other rules.

As an example of a relational operation, using the above-recited example as the sequence, the algorithm could be return the lowest element of each of the rows, in which case the proper token input would be 3,2. As another example, the algorithm may be add the first two elements of the row for a first value and use the third element for a second value, in which case the correct token would be 15,3,9,2. Operations/algorithms can extend between the sub-arrays, as well. For example, the algorithm may be multiply each element in sequence from the first sub-array with each element from the second sub-array and use those as a token string. The proper token for the above example sequence would be 40,28,6.

As illustrated by the examples, very complex and strong mechanisms may be implemented by the present invention, depending on the relative complexity of the hint display, which may be made arbitrarily large, values of the elements, which may also have arbitrarily large ranges, and the complexity of the algorithms employed. In general, there is a direct trade-off of the ease with which a pattern and algorithm can be memorized and the level of security afforded by the particular combination.

Figure 3:
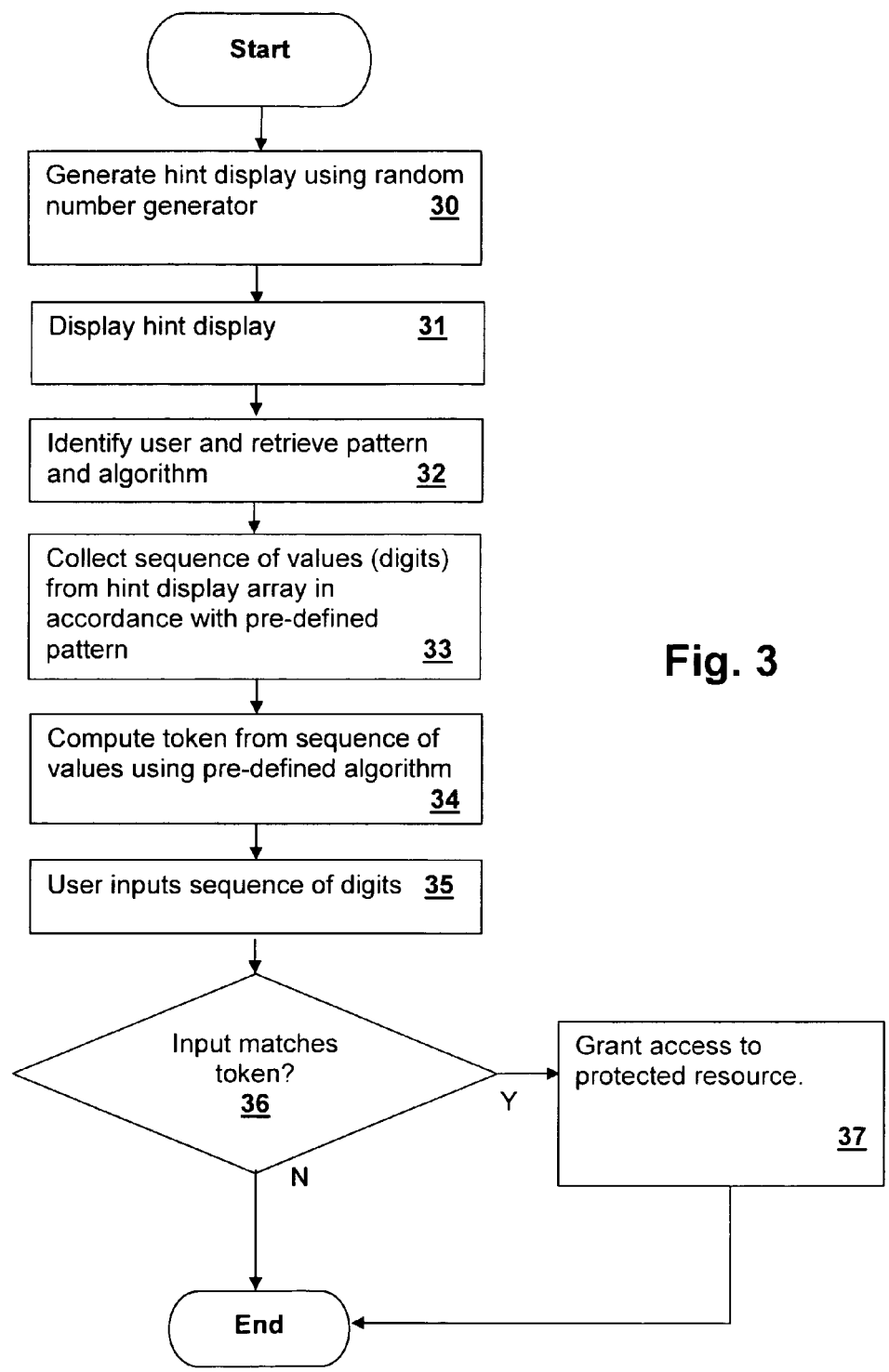
FIG. 3 is a flowchart depicting operation of a system as embodied in a method in accordance with an embodiment of the invention.

Referring now to FIG. 3, a flowchart illustrating a method in accordance with an embodiment of the present invention is depicted. The method may be implemented by program instructions executing within a computing device such as a personal computer, workstation or dedicated terminal such as an ATM. The program instructions may be embodied in a compute program product comprising media encoding said program instructions. A hint display is generated using a random number generator (step 30) and the hint display is displayed (step 31). The user is then identified via the userid input field 20 and the user's pattern and algorithm are retrieved from storage (step 32). Next, the sequence of values from the hint display are collected in accordance with the predefined pattern of elements (step 33). The token is then computed using the collected values according to the predefined algorithm (step 34). When a user inputs a sequence of digits (step 35) the sequence is compared against the token values computed in step 33 and if the input sequence matches, (decision 36), then access to the protected resource is granted (step 37).

A control panel for configuring the algorithm and pattern is also provided in accordance with another embodiment of the present invention, and may be graphically or textually implemented. Graphical control panels will generally permit selection of the pattern sequence via a pointing device and then assign rules to combinations of values or individual values from the elements in the pattern. A textual control panel can accept a string that describes the pattern and algorithm, for example by using the matrix positions as subscripts, each element can be uniquely identified by a position number. Operators can be given their own symbols such as "R" for replicate, "+" for sum, "X" for multiply, "S" for "smaller of" and so forth. Any sub-arrays while arranged in their "native" order can be combined in one matrix for the purposes of encoding the string.

For example, if the position numbers are assigned left-to-right across rows and descending through the hint display, the above-exemplified algorithm multiplies each element in sequence from the first sub-array with each element from the second sub-array and use those as a token string, could be encoded as: "E1XE25,E2XE26,E3XE27", where X is the "multiply" operator. (Elements 25-27 correspond to the middle row of sub-array 24B as used in the example above.)

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method carried out by an authentication system using a user interface having a display for receiving input of a security token by a user protecting a resource to be used by the user, comprising:

generating a hint display made up of elements arranged in an array;

providing a predetermined pattern in the array of selected ones of the elements of the array;

each element in the predetermined pattern having a unique position characteristic in the array;

at least one of the elements in the predetermined pattern having a numerical value;

displaying said hint display to said user;

causing said user to compute a token from said elements of said predetermined pattern of elements of said generated hint display;

during computing of the token causing said user to perform at least one operation on said numerical value of said at least one of said elements falling within said predetermined pattern such that the token comprises at least one hidden numerical value which is not identical to the numerical value of said at least one of said elements upon which the non-identity operation is performed;

causing said user to enter the token into the user interface;

receiving said token from said user in which the token comprises at least one character; and comparing said at least one hidden numerical value of the token received with at least one corresponding numerical value of a corresponding token generated by the authentication system;

and selectively providing access to said resource in conformity with a matching result of said comparing.

2. The method of claim 1, wherein at least two of the elements in the predetermined pattern have a numerical value and wherein said operation of said computing combines said numerical values of said two elements in at least one mathematical operation.

3. The method of claim 1, wherein at least three of the elements in the predetermined pattern have a numerical value and wherein said computing selects between at least two of said numerical values of said three elements using a relational operator and excludes at least one unselected numerical value of said three elements in determining a result of said computing.

4. The method of claim 1, wherein said elements of said array are arranged in a plurality of visually identifiable sub-arrays, wherein said position of each element in said predetermined pattern is further indicated by membership in a corresponding sub-array.

5. The method of claim 1, further comprising identifying said user and in response to identifying said user, selecting said predetermined pattern from storage in response to said identification.

6. The method of claim 5, wherein the sub-arrays are visually distinguished from each other by color.

7. The method of claim 5, wherein each of the sub-arrays is a 3×3 array of the elements.

8. The method of claim 1, for a plurality of users wherein a complexity of said computing is independently settable for each user.

9. The method of claim 1, wherein all of the elements in the predetermined pattern have a numerical value.

* * * * *